United States Patent
Nelson et al.

(10) Patent No.: US 6,650,507 B2
(45) Date of Patent: Nov. 18, 2003

(54) ACTUATOR WITH DISCRETE MOLDED IN BUMPER STOP

(75) Inventors: Eldon Leroy Nelson, Oklahoma City, OK (US); Steve Scott Eckerd, Oklahoma City, OK (US); Roy L. Wood, Yukon, OK (US); Mohammad Noman Ahmad, Oklahoma City, OK (US)

(73) Assignee: Seagate Technology LLC, Scotts Valley, CA (US)

( * ) Notice: Subject to any disclaimer, the term of this patent is extended or adjusted under 35 U.S.C. 154(b) by 181 days.

(21) Appl. No.: 09/896,757

(22) Filed: Jun. 29, 2001

(65) Prior Publication Data

US 2002/0012203 A1 Jan. 31, 2002

Related U.S. Application Data

(60) Provisional application No. 60/220,723, filed on Jul. 26, 2000.

(51) Int. Cl.$^7$ .................................................. G11B 5/55
(52) U.S. Cl. ..................................................... 360/265.1
(58) Field of Search ............................. 360/256–256.6, 360/264.1–267.9

(56) References Cited

U.S. PATENT DOCUMENTS

| 5,455,726 A | * | 10/1995 | Liu .......................... 360/265.1 |
| 5,523,912 A | | 6/1996 | Koriyama |
| 5,570,250 A | * | 10/1996 | Casey ...................... 360/265.7 |
| 5,600,516 A | | 2/1997 | Phillips et al. |
| 5,621,590 A | | 4/1997 | Pace et al. |
| 5,659,449 A | | 8/1997 | Brooks, Jr. et al. |
| 5,715,119 A | | 2/1998 | Williams et al. |
| 5,973,888 A | | 10/1999 | Chawanya et al. |
| 5,999,375 A | | 12/1999 | Forbord et al. |

* cited by examiner

Primary Examiner—A. J. Heinz
(74) Attorney, Agent, or Firm—Derek J. Berger

(57) ABSTRACT

An actuator with a discrete molded in bumper stop for a disc drive. The actuator has an actuator body moveably supported within the disc drive. A discrete bumper stop has an attaching portion disposed adjacent the actuator body, and an extended portion projecting from the attaching portion engageable with a reference surface of the disc drive at a selected position of the actuator. An overmold member connects the attaching portion of the bumper stop to the actuator body.

12 Claims, 5 Drawing Sheets

ACTUATOR WITH DISCRETE MOLDED IN BUMPER STOP

CROSS REFERENCE TO RELATED APPLICATION

This application claims the benefit of United States Provisional Application No. 60/220,723 entitled OVERMOLDED ACTUATOR WITH DISCRETE MOLDED IN CRASH STOP, filed Jul. 26, 2000.

FIELD OF THE INVENTION

This invention relates generally to the field of disc drive data storage devices, and more particularly but not by way of limitation, to bumper stops for limiting the actuator movement in a disc drive.

BACKGROUND OF THE INVENTION

Modern disc drives are commonly used in a multitude of computer environments to store large amounts of data in a form that is readily available to a user. Generally, a disc drive has a magnetic disc, or two or more stacked magnetic discs, that are rotated by a motor at a high speed. Each disc has a data storage surface divided into a series of generally concentric data tracks where data is stored in the form of magnetic flux transitions.

A data transfer member such as a magnetic transducer is moved by an actuator to selected positions adjacent the data storage surface to sense the magnetic flux transitions in reading data from the disc, and to transmit electrical signals to induce the magnetic flux transitions in writing data to the disc. The active elements of the data transfer member are supported by suspension structures extending from the actuator. The active elements are maintained a small distance above the data storage surface upon an air bearing sustained by air currents caused by the spinning discs.

A continuing trend in the industry is toward ever-increasing data storage capacity and processing speed while maintaining or reducing the physical size of the disc drive. Consequently, the data transfer member and supporting structures are continually being miniaturized, while data storage densities are continually being increased. The result is an overall increased sensitivity to vibration and shock. Increased data storage capacity has also decreased the allocation of non-data storage space on the discs, resulting in minimal space for actuator landing zones. Increased processing speed also requires increased actuator acceleration and deceleration in moving the read/write head from one track to another.

These demands require fundamentally tighter control of the actuator movement so as to better control the data transfer member travel along the data storage surface. Typically, the desired limit of inward travel is the landing zone where the data transfer member is parked during disc drive shut down. Travel beyond the landing zone can cause the data transfer member to strike the motor. Conversely, the desired limit of outward travel is an overshoot cushion zone beyond the outermost data track. Travel beyond the cushion zone can cause the data transfer member to move beyond the sustaining air bearing of the spinning discs.

Actuator stops are commonly employed to limit the actuator rotational movement. It is common to use a pair of actuator stops, an inner stop limiting inward movement and an outer stop limiting outward movement. Although there are different types of actuator stops in use, generally all are associated with an abutting engagement of the advancing actuator to positively stop the movement thereof.

It is important that the actuator stop decelerate the actuator quickly and in a short distance, but without damaging the data transfer member. For example, the impact response imparted by the actuator stop to the actuator must transfer a deceleration force that is less than a threshold force that would cause a transducer to deflect away from the suspension and thereby either contact the data storage surface or plastically deform the suspension.

Rigidly supported stop pins provide an impact response with a relatively minimal stopping distance, but typically at the expense of unacceptably high deceleration forces. Cantilevered stop pins reduce the impact force but can be unpredictable, due to relatively low accuracy from warpage, and can be susceptible to imparting ringing in the actuator.

Generally, damping the impact is widely employed, such as with the use of elastomeric members and spring members, but manufacturability and cost constraints require simple mechanisms. Damping members also disadvantageously result in relatively long stopping distances.

What the prior art has been lacking is a bumper stop which is effective and highly precise, yet inexpensive and easy to manufacture and install so it may be cost-effectively implemented in disc drives.

SUMMARY OF INVENTION

The present invention provides a disc drive actuator bumper stop for an actuator moveably supported within an enclosure of the disc drive in a data reading and writing relationship with a data storage region of a data disc. A discrete bumper stop is overmolded to the actuator so as to be abuttingly engageable with a reference surface portion of the disc drive at a selected position of the actuator, thereby limiting the actuator movement in relation to the data storage region. Additional features and benefits will become apparent upon a review of the attached figures and the accompanying description.

DETAILED DESCRIPTION OF THE PREFERRED EMBODIMENTS

Figure 1:
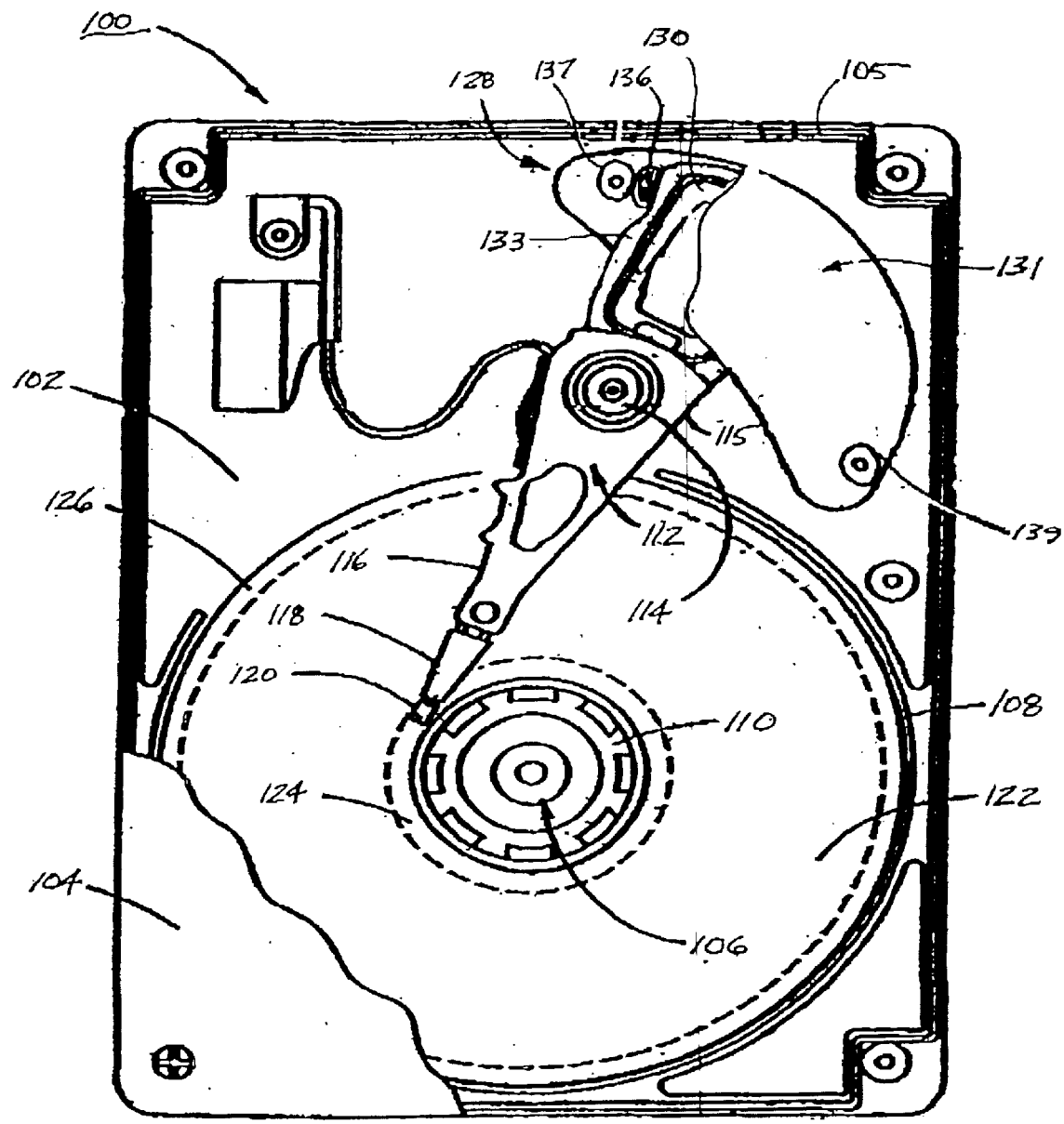
FIG. 1 is a diagrammatic plan representation of a disc drive constructed in accordance with a preferred embodiment of the present invention, wherein a portion of the voice coil motor is shown partially cut away to reveal the bumper stop of the present invention.

Referring to the drawings in general, and more particularly to FIG. 1, shown therein is a plan representation of a disc drive 100 constructed in accordance with the present invention. The disc drive 100 includes a base deck 102 to which various disc drive components are mounted, and a cover 104 (partially cut-away) which together with the base deck 102 and a perimeter gasket 105 form an enclosure providing a sealed internal environment for the disc drive 100. Numerous details of construction are not included in the following description because they are well known to a skilled artisan and are unnecessary for an understanding of the present invention.

Mounted to the base deck 102 is a spindle motor 106 to which a plurality of discs 108 are stacked and secured by a clamp ring 110 for rotation at a high speed. Adjacent discs are typically separated by a disc spacer (not shown). An actuator 112 pivots around a pivot bearing 114 in a plane parallel to the discs 108. The actuator 112 includes an actuator body 115 that is supported by the pivot bearing 114. The actuator body 115 has actuator arms 116 (only one shown) that support load arms 118 in movement across the discs 108 as the actuator arms 116 move within the spaces between adjacent discs 108. The load arms 118 are suspension members that support data transfer members such as read/write heads 120, with each of the read/write heads 120 adjacent a surface of one of the discs 108 and maintained in a data reading and writing spatial relationship by a slider (not shown) which operably supports the read/write head 120 on an air bearing created by air currents generated by the spinning discs 108.

Each of the discs 108 has a data storage region comprising a data recording surface 122 divided into concentric circular data tracks (not shown). Each of the read/write heads 120 is positioned adjacent a respective desired data track to read data from or write data to the data track. The data recording surface 122 is bounded inwardly by a circular landing zone 124 where the read/write heads 120 can come to rest against the discs 108 at times when the discs 108 are not spinning. The data recording surface 122 is similarly bounded outwardly by an overshoot cushion zone 126 beyond the outermost data track.

The actuator body 115 is pivotally positioned by a voice coil motor (VCM) 128 comprising an actuator coil 130 and a magnetic field source such as a magnet assembly 131. The magnet assembly 131 conventionally comprises one or more magnets supported by magnetic poles to complete the magnetic circuit. The top pole in FIG. 1 is partially cut away to reveal a portion of the actuator 112 at a proximal end of the actuator body 115. The actuator coil 130 is attached to the proximal end of the actuator body 115 by a molding process forming an overmold member 133.

When controlled current is passed through the actuator coil 130, an electromagnetic field is set up which interacts with the magnetic circuit of the magnet assembly 131 to cause the actuator coil 130 to move. As the actuator coil 130 moves, the actuator body 115 pivots around the pivot bearing 114, causing the actuator arms 116 to move the read/write heads 120 across the discs 108.

The actuator 112 is shown in FIG. 1 having positioned the read/write head 120 in the landing zone 124. Further inward travel of the read/write head 120 is prevented by an abutting engagement of an actuator stop adjacent a reference surface at a selected pivotal position of the actuator 112. For example, the actuator stop of FIG. 1 comprises a discrete bumper stop 136 attached to the actuator body 115 by the overmold member 133. That is, the molding process discussed above for attaching the coil 130 to the actuator body 115 can also be utilized to attach the bumper stop 136 to the actuator body 115. The reference surface, for example, comprises a stop pin 137 supported by the VCM 128 so as to be disposed in the path of bumper stop 136 travel. Similarly, another actuator stop comprising a bumper stop 138 (see FIG. 2) abuttingly engages a reference surface, such as a stop pin 139, to limit the read/write head 120 outward travel.

By providing an actuator stop as a discrete component (bumper stop 136,138) that is molded to the actuator body 115, the material selected for fashioning the bumper stop 136, 138 can be optimized with respect to functionality, such as the desired bumper stop 136, 138 impact response characteristics. Likewise, the material selected for fashioning the overmold member 133 can be optimized with respect to functionality, such as bonding strength or cure time.

In a preferred embodiment, therefore, the bumper stop 136,138 comprises a polymeric material with a characteristic high strength to modulus ratio, and with a characteristic constant performance throughout the range of expected environmental operating temperatures. Materials well-suited for constructing the bumper stop 136, 138 include, for example, polyetherimide, such as Ultem® made by General Electric, and polyphenylsulfone, such as Radel R® made by BP Amoco. Preferably the overmold member 133 comprises a polymeric material different than the bumper stop 136.

Figure 2:
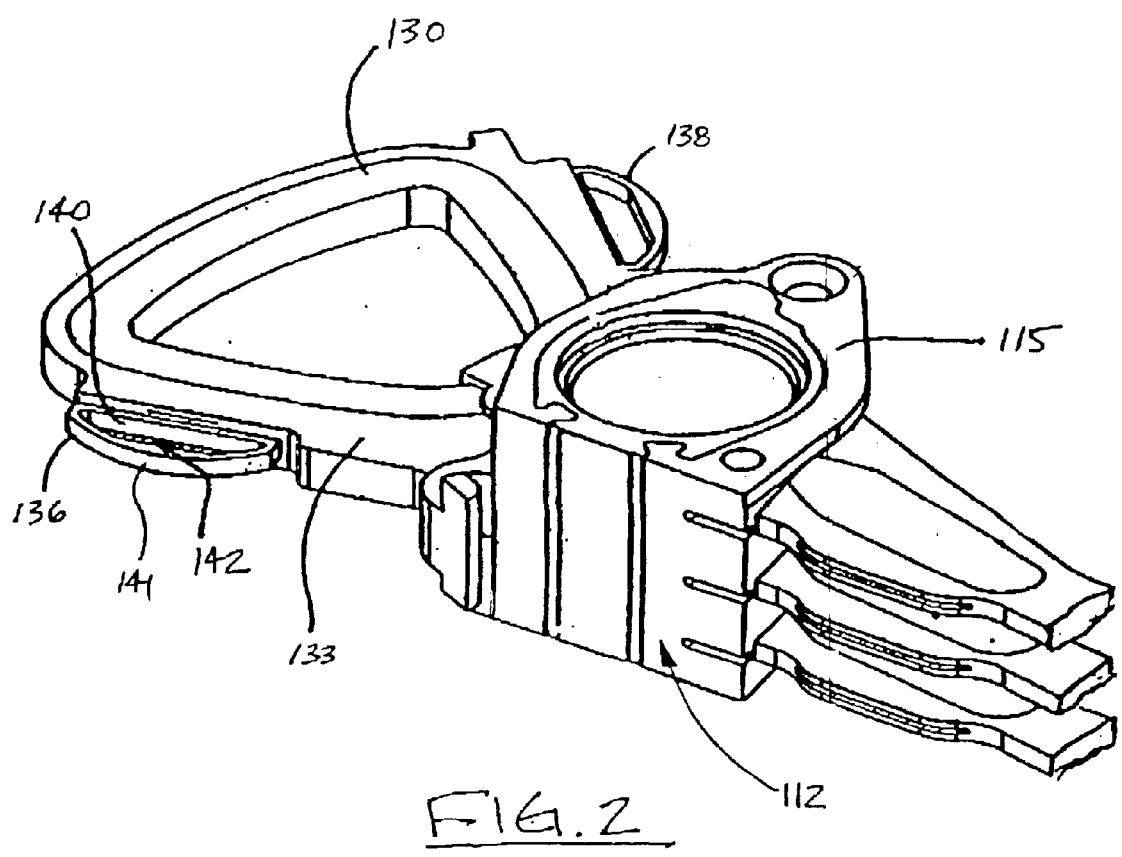
FIG. 2 is an isometric representation of a portion of the actuator of the disc drive of FIG. 1.

Turning now to FIG. 2 which is an isometric representation of a portion of the actuator 112 of the disc drive 100 of FIG. 1. The bumper stop 136 comprises an attaching portion 140 connected to the overmold member 133. The bumper stop 136 furthermore comprises an extended portion projecting from the attaching portion 140. The extended portion comprises a contacting portion 141 that is abuttingly engageable with the reference surface, such as the stop pin 137 (FIG. 1). In a preferred embodiment, a gap 142 is formed between the contacting portion 141 and the attaching portion 140. The bumper stop 138, although not delineated in FIG. 2, likewise comprises an attaching portion and an extended contacting portion with a gap formed therebetween.

Figure 3:
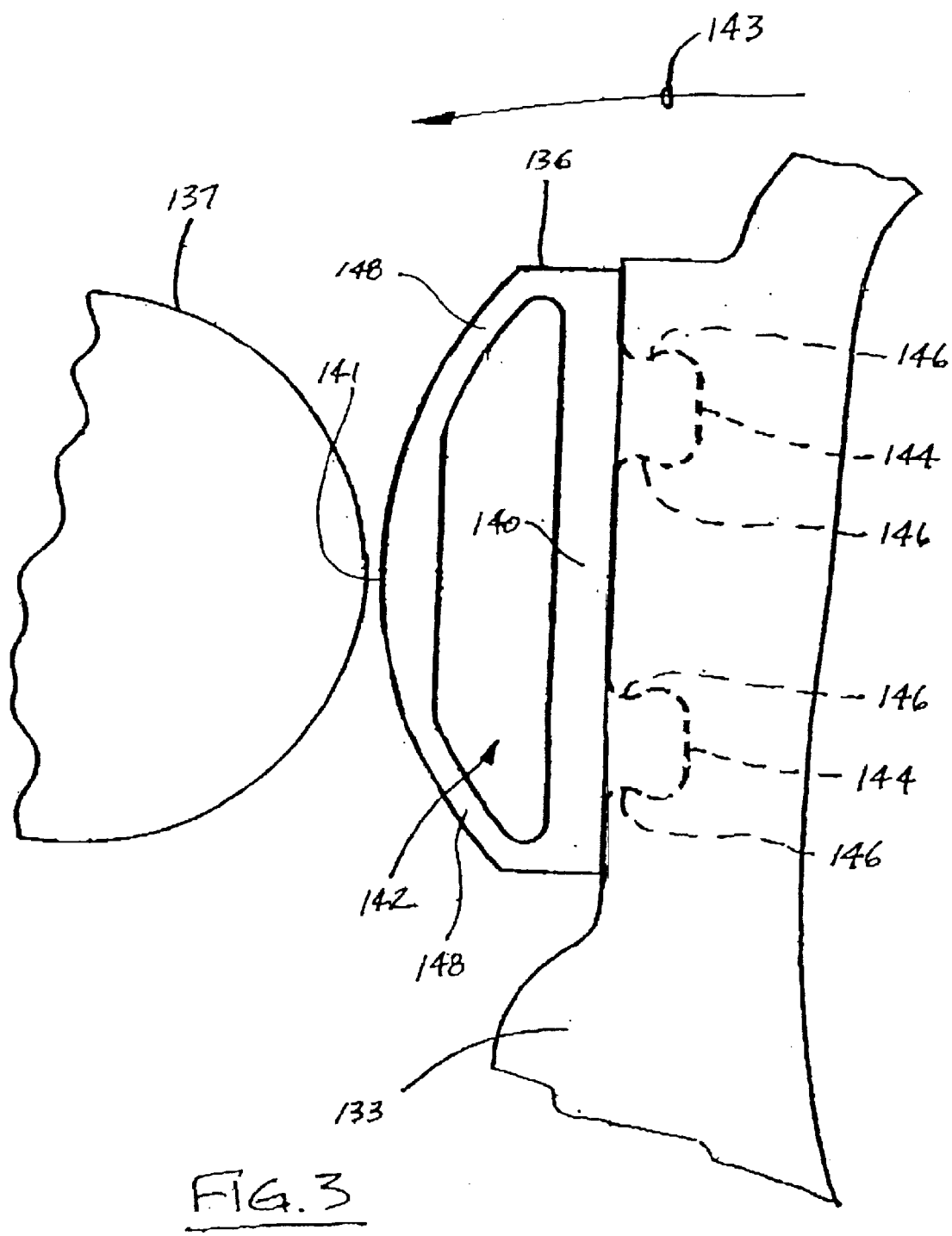
FIG. 3 is an enlarged detail representation of a portion of the actuator of FIG. 2, at a time when the bumper stop is approaching the reference surface.

FIG. 3 is an enlarged detail representation of the bumper stop 136 supported by the overmold member 133, at a time when moving in a direction denoted by reference number 143 toward the stop pin 137. To strengthen the molded securement of the bumper stop 136, the bumper stop 136 can have one or more anchors 144 (shown in hidden lines) extending from the attaching portion 140, around which the overmold member 133 forms. Detent portions 146 provide recessed pockets within which the overmold member 133 forms to grippingly retain the bumper stop 136.

The extended portion of the bumper stop 136 furthermore comprises one or more connecting portions 148 connecting the contacting portion 141 and the attaching portion 140 and spanning the gap therebetween. Preferably, the compressive yield strength of the contacting portion 141 is greater than that of the connecting portion 148 so that in response to an abutting engagement with the reference surface the contacting portion is deflectable into the gap 142 toward the attaching portion 140. Alternatively, where the contacting portion 141 is of substantially equal or lesser compressive yield strength in comparison to the connecting portion 148, the impact response is substantially similar to that of a cantilevered stopping member. It has been found that the stiffer impact response of the preferred embodiment of FIG. 1 resultingly imparts a better and more predictable impact response on the actuator 112.

Figure 4:
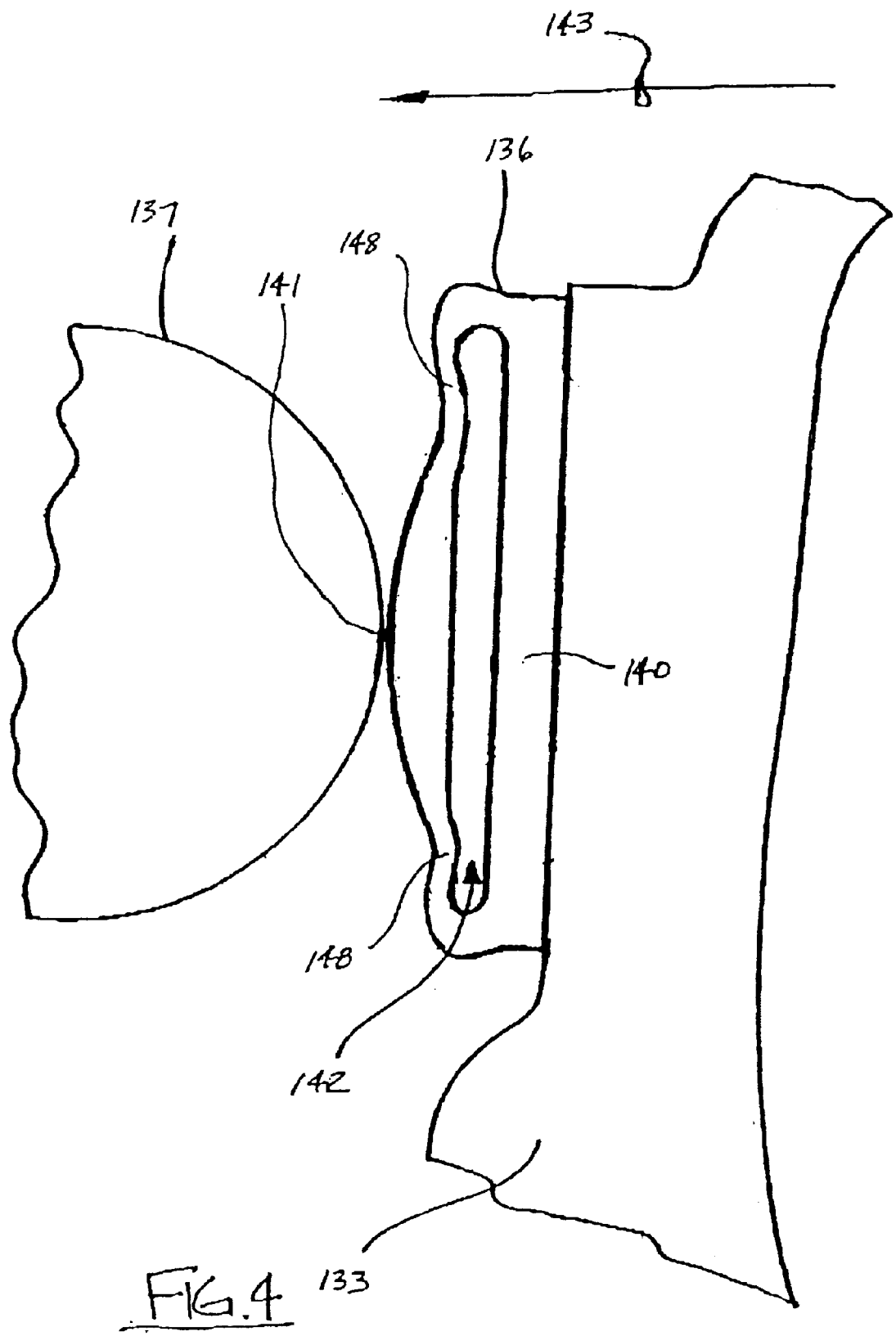
FIG. 4 is an enlarged detail representation of a portion of the actuator similar to FIG. 3, at a time when the actuator is being decelerated by the impact of the bumper stop against the reference surface.

One way of providing the contacting portion 141 with a relatively greater compressive yield strength is to provide a greater extended portion cross section thickness at the contacting portion with respect to the connecting portion 148, as shown in FIG. 3. Accordingly, as seen in FIG. 4, the contacting portion 141 acts substantially as a rigid member that is deflectable into the gap 142 as the connecting portion 148 yields. The characteristic impact response of the bumper stop 136, as kinetic energy dissipates from the actuator 112, is thus associated with the deflection characteristics of the contacting portion 141. The desired impact response can be achieved by an appropriate selection of material and physical arrangement.

Figure 5:
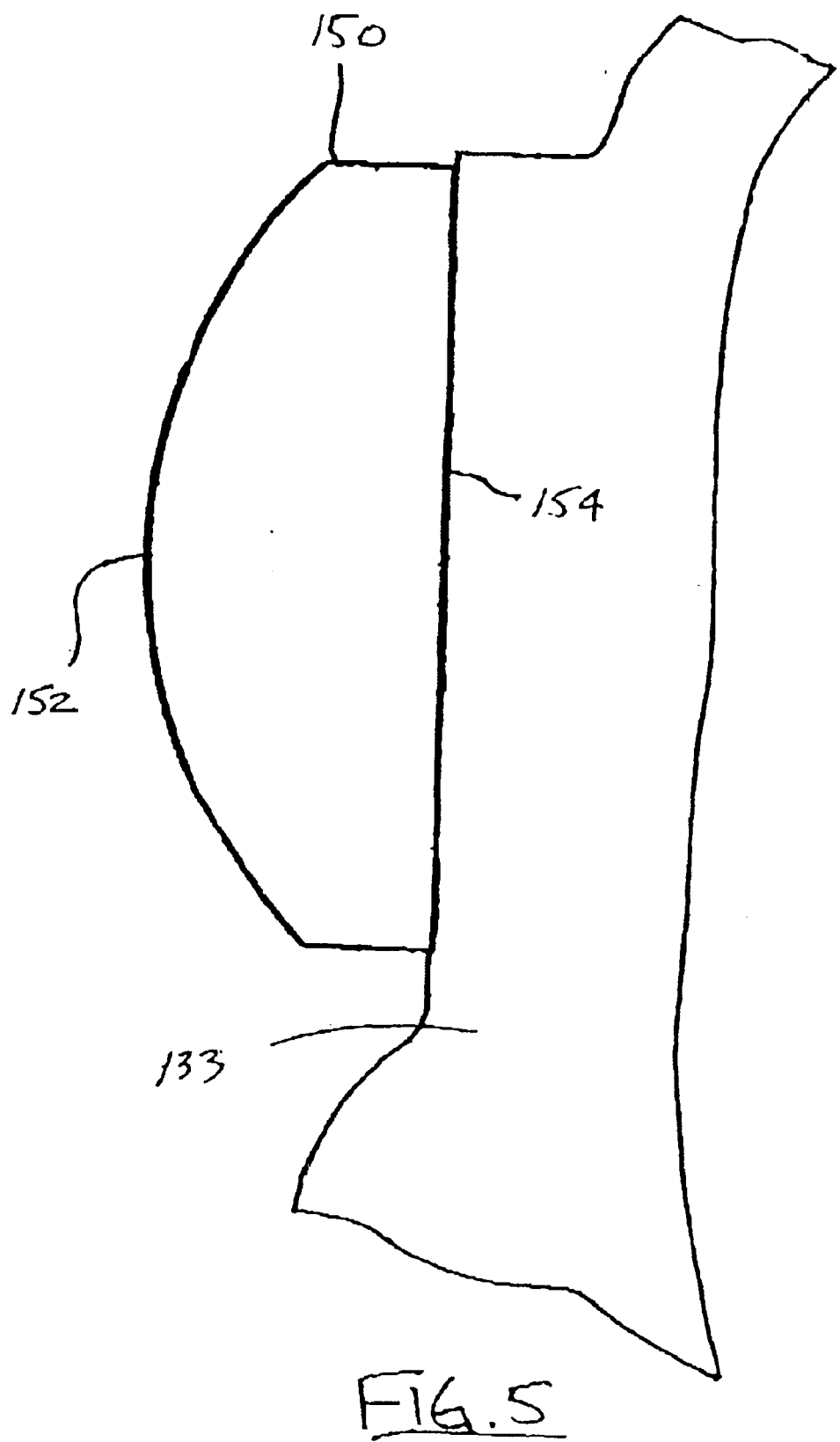
FIG. 5 is an enlarged detail representation similar to FIG. 3 but of an actuator constructed in accordance with an alternative embodiment comprising a solid bumper stop.

FIG. 5 is an enlarged plan view of a bumper stop 150 constructed in accordance with another embodiment of the present invention. The bumper stop 150 similarly has a contacting portion 152 that is abuttingly engageable with a reference surface and an attaching portion 154 moldingly connected to the overmold member 133. As discussed above, the desired impact response can be selectively determined by the material and characteristic features of the bumper stop 150. FIG. 5 illustrates a solid-shaped bumper stop which will compressingly impart a characteristic impact response. Alternatively, the bumper stop 150 can be modified to provide detent features and/or internal gaps or fluid-filled pockets (not shown) to provide a desired impact response. Alternately characterized, a first contemplated embodiment of the invention takes the form of an actuator 112 for a disc drive 100 including a movable actuator body 115, a bumper stop 136 adjacent the actuator body 115 and extending outwardly from the actuator body 115 for engaging a fixed reference surface 137, and an overmold member 133 connecting the bumper stop 136 to the actuator body 115. Optionally, the bumper stop 136 may be of a polymeric material. As a further option, the overmold member 133 may be of a polymeric material different from the material of the bumper stop 136. As yet another option, an electrical coil 130 may also be supported by the overmold member 133. As still another option, the bumper stop 136 may also include an attaching portion 140 connected to the overmold member 133 and an extended portion projecting from the attaching portion 140. Optionally, the extended portion may further include a contacting portion 141 for engaging the reference surface 137, configured such that a gap 142 exists between the contacting portion 141 and the attaching portion 140. The extended potions may also include a connecting portion 148 connecting the contacting portion 141 and the attaching portion 140 and spanning the gap 142 therebetween. The compressive yield strength of the contacting portion 141 may be greater than the compressive yield strength of the connecting portion 148, such that the contacting portion 141 is configured to deflect toward the attaching portion 148 in response to engagement with the reference surface 137. The cross sectional thickness of the contacting portion 141 may be substantially greater than a cross sectional thickness of the connecting portion 148.

Alternately characterized, a second contemplated embodiment of the invention takes the form of a disc drive 100 having a movable actuator body 115, a stationary reference surface 137, a bumper stop 136 next to and extending outwardly from the actuator body 115 for engaging the reference surface 137, and an overmold member 133 connecting the bumper stop 136 to the actuator body 115. Optionally, an electrical coil 130 may be supported by the overmold member 133 for interacting with a magnetic field to selectively move the actuator body 115. As a further option, the drive 100 may include a magnet assembly 131 for generating a magnetic field for selectively moving the actuator body 115. The magnet assembly 131 may include a magnetic pole member 128 to which the reference surface 137 is mounted within the path of travel of the bumper stop 136. As a further option, the drive 100 may include a rotatable disc 122 and a head 120 supported by the actuator body 115, The head 120 may be moveable adjacent a data storage surface of the disc 122, and the bumper stop 136 may configured to prevent further movement of the actuator body 115 in a direction when the head 120 is moved to a predetermined boundary on the data storage surface of the disc 122. As yet another option, the reference surface 137 may be located on a stop pin.

It should be clear that the present invention is well adapted to attain the ends and advantages mentioned as well as those inherent therein. While a presently preferred embodiment of the invention has been described for purposes of the disclosure, it will be understood that numerous changes may be made in the construction, operation and arrangement of the various elements, steps and procedures without departing from the spirit and scope of the invention as defined in the following claims.

What is claimed is:

1. An actuator for a disc drive, comprising:
   a movable actuator body;
   a bumper stop adjacent the actuator body and extending outwardly from the actuator body for engaging a fixed reference surface of the disc drive, the bumper stop comprising a polymeric material; and
   an overmold member connecting the bumper stop to the actuator body, the overmold member comprising a polymeric material different from the material of the bumper stop.

2. The actuator of claim 1, further comprising:
   an electrical coil supported by the overmold member.

3. The actuator of claim 1, in which the bumper stop further comprises:
   an attaching portion connected to the overmold member; and
   an extended portion projecting from the attaching portion.

4. The actuator of claim 3, in which the extended portion further comprises:
   a contacting portion for engaging the reference surface, configured such that a gap exists between the contacting portion and the attaching portion.

5. The actuator of claim 4, in which the extended portion further comprises:
   a connecting portion connecting the contacting portion and the attaching portion and spanning the gap therebetween, the compressive yield strength of the contacting portion being greater than the compressive yield strength of the connecting portion, such that the contacting portion is configured to deflect toward the attaching portion in response to engagement with the reference surface.

6. The actuator of claim 4, in which a cross sectional thickness of the contacting portion is substantially greater than a cross sectional thickness of the connecting portion.

7. An actuator, comprising:
   a movable actuator body; and
   a bumper stop mounted to the actuator body, the bumper stop comprising:
      first and second connecting portions defining a gap therebetween, each connecting portion extending away from the actuator body; and
      a contacting member connected to both connecting members, the contacting member being configured to deflect into the gap upon contact with a reference surface, each connecting portion being thinner than the contacting member.

8. The actuator of claim 7, in which the bumper stop consists of a single piece of material.

9. The actuator of claim 7, in which the bumper stop further comprises:
 an attaching portion connected to both connecting members, the attaching portion further being in direct contact with the actuator body.

10. The actuator of claim 7, in which the actuator is configured for use in a disc drive.

11. The actuator of claim 7, further comprising an overmold for mounting the bumper stop to the actuator body.

12. The actuator of claim 11, in which the bumper stop is discrete from the overmold.

* * * * *